(12) United States Patent
Islam et al.

(10) Patent No.: US 6,618,192 B2
(45) Date of Patent: Sep. 9, 2003

(54) HIGH EFFICIENCY RAMAN AMPLIFIER

(75) Inventors: Mohammed Islam, Ann Arbor, MI (US); Carl Dewilde, Richardson, TX (US); Michael Freeman, Canton, MI (US)

(73) Assignee: Xtera Communications, Inc., Allen, TX (US)

( * ) Notice: Subject to any disclaimer, the term of this patent is extended or adjusted under 35 U.S.C. 154(b) by 0 days.

(21) Appl. No.: 09/847,949

(22) Filed: May 2, 2001

(65) Prior Publication Data

US 2002/0044335 A1 Apr. 18, 2002

Related U.S. Application Data

(63) Continuation-in-part of application No. 09/768,367, filed on Jan. 22, 2001, which is a continuation-in-part of application No. 09/719,591, filed as application No. PCT/US99/13551 on Jun. 16, 1999.

(60) Provisional application No. 60/089,426, filed on Jun. 16, 1998.

(51) Int. Cl.⁷ .................................................. H01S 3/00
(52) U.S. Cl. ........................................................ 359/334
(58) Field of Search ............................... 372/3; 359/334

(56) References Cited

U.S. PATENT DOCUMENTS

| | | | | |
|---|---|---|---|---|
| 4,881,790 A | * | 11/1989 | Mollenauer | 359/173 |
| 4,932,739 A | | 6/1990 | Islam | 350/96.15 |
| 4,952,059 A | | 8/1990 | Desurvire et al. | 356/350 |
| 4,995,690 A | | 2/1991 | Islam | 350/96.15 |
| 5,020,050 A | | 5/1991 | Islam | 370/4 |
| 5,078,464 A | | 1/1992 | Islam | 385/122 |
| 5,101,456 A | | 3/1992 | Islam | 385/27 |
| 5,115,488 A | | 5/1992 | Islam et al. | 385/129 |
| 5,191,628 A | | 3/1993 | Byron | 385/27 |
| 5,224,194 A | | 6/1993 | Islam | 385/122 |

(List continued on next page.)

FOREIGN PATENT DOCUMENTS

| | | | | |
|---|---|---|---|---|
| EP | 0 421 675 A2 | 4/1991 | | H04B/10/16 |
| EP | 0 841 764 A2 | 5/1998 | | H04B/10/17 |
| EP | 0 903 877 A2 | 3/1999 | | H04B/10/18 |
| EP | 1 054 489 A2 | 11/2000 | | H01S/10/17 |
| FR | 2 764 452 A1 | 12/1998 | | H04J/14/02 |

(List continued on next page.)

OTHER PUBLICATIONS

PCT/US99/06231 International Search Report Completed May 12, 1999.*
PCT/US99/06428 International Search Report Completed Jun. 18, 1999.*
PCT/US01/11894 International Search Report Completed Jan. 16, 2002.*
PCT/US01/05089 International Search Report Completed Nov. 23, 2001.*
Hamoir et al. Raman Amplifier with a conversion efficiency in excess of 20%. Optical Amplifiers and their Applications Conference. 1999. pp. 165–167.*

(List continued on next page.)

Primary Examiner—Thomas G. Black
Assistant Examiner—Deandra M. Hughes
(74) Attorney, Agent, or Firm—Baker Botts L.L.P.

(57) ABSTRACT

An amplifier apparatus includes an optical transmission line with a Raman amplification region that provides a pump to signal power conversion efficiency of at least 20%. The Raman amplification region is configured to amplify a signal with multiple wavelengths over at least a 30 nm range of wavelengths. A pump source is coupled to the optical transmission line. An input optical signal is amplified in the Raman amplification region and an output signal is generated that has at least 100 mW more power than the input optical signal.

118 Claims, 10 Drawing Sheets

U.S. PATENT DOCUMENTS

| | | | |
|---|---|---|---|
| 5,257,124 A | 10/1993 | Glaab et al. | 359/124 |
| 5,295,209 A | 3/1994 | Huber | 385/37 |
| 5,369,519 A | 11/1994 | Islam | 359/173 |
| 5,485,536 A | 1/1996 | Islam | 385/31 |
| 5,497,386 A | 3/1996 | Fontana | 372/18 |
| 5,513,194 A | 4/1996 | Tamura et al. | 372/6 |
| 5,664,036 A | 9/1997 | Islam | 385/31 |
| 5,768,012 A | 6/1998 | Zanoni | 359/341 |
| 5,778,014 A | 7/1998 | Islam | 372/6 |
| 5,796,909 A | 8/1998 | Islam | 385/147 |
| 5,798,853 A | 8/1998 | Watanabe | 359/160 |
| 5,815,518 A | 9/1998 | Reed et al. | 372/6 |
| 5,905,838 A | 5/1999 | Judy et al. | 385/123 |
| 6,043,927 A | 3/2000 | Islam | 359/332 |
| 6,052,393 A | 4/2000 | Islam | 359/341 |
| 6,081,355 A | 6/2000 | Sharma et al. | 359/110 |
| 6,081,366 A * | 6/2000 | Kidorf et al. | 359/334 |
| 6,101,024 A | 8/2000 | Islam et al. | 359/334 |
| 6,104,733 A | 8/2000 | Espindola | 372/6 |
| 6,147,794 A | 11/2000 | Stentz | 359/334 |
| 6,239,902 B1 | 5/2001 | Islam et al. | 359/334 |
| 6,239,903 B1 | 5/2001 | Islam et al. | 359/337 |
| 6,310,716 B1 | 10/2001 | Evans et al. | 359/334 |
| 6,320,884 B1 | 11/2001 | Kerfoot, III et al. | 372/3 |
| 6,335,820 B1 | 1/2002 | Islam | 359/334 |
| 6,356,384 B1 | 3/2002 | Islam | 359/334 |
| 6,359,725 B1 | 3/2002 | Islam | 359/334 |
| 6,370,164 B1 | 4/2002 | Islam | 372/6 |
| 6,374,006 B1 | 4/2002 | Islam et al. | 385/15 |
| 6,381,391 B1 | 4/2002 | Islam et al. | 385/123 |
| 2001/0014194 A1 | 8/2001 | Sasaoka et al. | 385/15 |

FOREIGN PATENT DOCUMENTS

| | | | | |
|---|---|---|---|---|
| JP | 0 9 197452 A | 7/1997 | | G02F/1/35 |
| WO | 99/41855 | 8/1999 | | H04B/10/02 |
| WO | 99/48176 | 9/1999 | | H01S/3/30 |
| WO | 99/49580 | 9/1999 | | |
| WO | 99/62407 | 12/1999 | | A61B/17/04 |
| WO | 01/52372 A1 | 7/2001 | | H01S/3/30 |
| WO | 01/76350 A2 | 10/2001 | | |
| WO | 01/78264 A2 | 10/2001 | | H04B/10/00 |
| WO | 01/78263 A2 | 10/2002 | | H04B/10/00 |

OTHER PUBLICATIONS

Namiki et al. Recent Advances in Ultra–Wideband Raman Amplfiers. OFCC Mar. 7–10, 2000. pp. 98–99, vol. 4.*

Lewis et al. Low–Noise High Gain Dispersion Compensating Broadband Raman Amplifier. OFCC Mar. 7–10, 2000, pp. 5–7, vol. 1.*

Roy et al. 48% Power Conversion Efficiency in a Single–Pump Gain–Shifted Thulium–Doped Fiber Amplifier. OFCC Mar. 17–22, 2001. pp. 17–22, vol. 4.*

Fludger et al. Fundamental Noise Limits in Broadband Raman Amplifiers. OFCC Mar. 17–22, 2001. pp. MA5/1–MA5/3, vol. 1.*

Fludger et al. An Analysis of the Improvements in OSNR from Distributed Raman Amplifiers Using Modern Transmission Fibres. OFCC Mar. 7–10, 2000. pp. 100–102. vol. 4.*

Aso et al. Recent Advances in Ultra–Broadband Fiberoptics Wavelength Converters. Lasers and Electro–Optics Society 2000 Annual Meeting. Nov. 13–16, 2000, pp. 683–684. vol. 2.*

Provino et al. Broadband and Nearly Flat Parametric Gain in Single–Mode Fibers. Lasers and Electro–Optics Society 2000 Annual Meeting. Nov. 13–16, 2000, pp. 683–684. vol. 2.*

Jackson, Stuart. Theoretical Characterization of Raman Oscillation with Intracavity Pumping of Fiber Lasers. IEEE Journal of Quantum Electronics, vol. 37, No. 5, May 2001, pp. 626–634.*

Vareille et al. Numerical Optimisation of Power Conversion Efficiency in 1480nm Multi–Stokes Raman Fibre Lasers. Electronics Letters. 2nd Apr. 1998, vol. 34, No. 7. pp. 675–676.*

Rini et al. Numerical Modeling and Optimization of Cascaded CW Raman Fiber Lasers. IEEE Journal of Quantum Electronics, vol. 36, No. 10, Oct. 2000. pp. 1117–1122.*

S.A.E. Lewis, S.V. Chernikov, and J.R. Taylor, "1.4W Saturated Output Power From a Fibre Raman Amplifier", OFC 1999 Technical Digest, paper WG5 pp. 114–116.

Paul Freeman, Dan Ratoff, Dave Mehuys, Ray Zanoni, and Mark Laliberte, "High Capacity EDFA with Output Power to Support Densley Loaded Channels", OFC 1999 Technical Digest, paper WA6 pp. 16–18.

Lew Goldberg and Jeffrey Koplow, "High Power Side–Pumped Er/Yb Dobed Fiber Amplifier", OFC 1999 Technical Digest, paper WA7 pp. 19–21.

F. Di Pasquale, G. Grasso, F. Meli, G Sacchi, and S. Turolla (1999), 23 dBm Output Power Er/Yb Co–Doped Fiber Amplifier for WDM Signals in the 1575–1605 nm Wavelength region, OFC 1999 Tecnical Digest, paper WA2 pp. 4–6.

Stolen et al., "Parametric Amplification and Frequency Conversion in Optical Fibers," IEEE Journal of Quantum Electronics, vol. QE–18, No. 7, pp. 1062–1072, Jul. 1982.

Song et al., "Sensitivity improvement for NRZ optical systems using NALM and narrow–band filter," LEOS, vol. 2, pp. 111–112, Nov. 18–19, 1996.

Agrawal, "Fiber–Optic Communication Systems," Second Edition, Basic Concepts, 2nd Ed. John Wiley & Sons, pp. 365–366, 1997.

Leng et al., "8–channel WDM soliton amplification and signal recovery," ECOC, vol. 1, pp. 105–106, Sep. 20–24, 1998.

Becker et al., "Erbium Doped Fiber Amplifiers Fundamentals and Technology," Academic Press, pp. 55–60, 1999.

Arend et al., "A nonlinear amplifying loop mirror operating with wavelength division multiplexed data," LEOS, vol. 2, pp. 479–480, 1999.

Nissov et al, "Rayleigh crosstalk in long cascades of distributed unsaturated Raman amplifiers," Electronics Letters, vol. 35, No. 12, pp. 997–998, Jun. 10, 1999.

Lewis et al., "Gain and saturation characteristics of dual–wavelength–pumped silica–fibre Raman amplifiers," Electronics Letters, vol. 35, No. 14, pp. 1178–1179, Jul. 08, 1999.

Suzuki et al., "50 GHz spaced, 32 × 10 Gbit/s dense WDM transmission in zero–dispersion region over 640km of dispersion–shifted fibre with multiwavelength distributed Raman amplification," Electronics Letters, vol. 35, No. 14, pp. 1175–1176, Jul. 8, 1999.

Emori et al., "100nm bandwidth flat–gain Raman amplifiers pumped and gain–equalised by 12–wavelength–channel WDM laser diode unit," Electronics Letters, vol. 35, No. 16, pp. 1355–1356, Aug. 5, 1999.

Yun et al., "Dynamic Erbium–Doped Fiber Amplifier Based on Active Gain Flattening with Fiber Acoustooptic Tunable Filters," IEEE Photonics Technology Letters, vol. 11, No. 10, pp. 1229–1231, Oct. 1999.

Nielsen et al., "3.28 Tb/s (82×40 Gb/s) transmission over 3 × 100 km nonzero–dispersion fiber using dual C– and L–band hybrid Raman/Erbium–doped inline amplifiers," OFCC 2000, pp. 1229–1231, Mar. 7–10, 2000.

Koch et al., "Broadband gain flattened Raman Amplifier to extend operation in the third telecommunication window," OFC 2000, pp. 103–105, Mar. 7–10, 2000.

Emori et al., "Cost–effective depolarized diode pump unit designed for C–band flat–gain Raman amplifiers to control EDFA gain profile," OFC 2000–1, pp. 106–108, Mar. 7–10, 2000.

Seo et al., "Compensation of Raman–Induced Crosstalk Using a Lumped Germanosilicate Fiber Raman Amplifier in the 1.571–1.591–$\mu$m Region," IEEE Photonics Technology Letters, vol. 13, No. 1, pp. 28–30, Jan. 2001.

Seo et al., "Simultaneous Amplification and Channel Equalization Using Raman Amplifier and Channel Equalization Using Raman Amplifier for 30 Channels in 1.3–$\mu$m Band," Journal of Lightwave Technology, vol. 19, No. 3, pp. 391–397, Mar. 2001.

Pending Patent Application; USSN 09/811,103; entitled "System and Method for Wide Band Raman Amplification," pp. 1–63, Filed Mar. 16, 2001.

Pending Patent Application; USSN 09/765,972; entitled "S+ Band Nonlinear Polarization Amplifiers," pp. 1–30, Filed Jan. 19, 2001.

Pending Patent Application; USSN 09/866,497; entitled "Nonlinear Fiber Amplifiers Used for A 1430–1530nm Low– Loss Window In Optical Fibers," pp. 1–29, Filed May 25, 2001.

Pending Patent Application; USSN 10/003,199; entitled "Broadband Amplifier and Communication System," pp. 1–21, Filed Oct. 30, 2001.

Pending Patent Application; USSN 09/990,142; entitled "Broadband Amplifier and Communication System," pp. 1–20, Filed Nov. 20, 2001.

* cited by examiner

FIG.—1

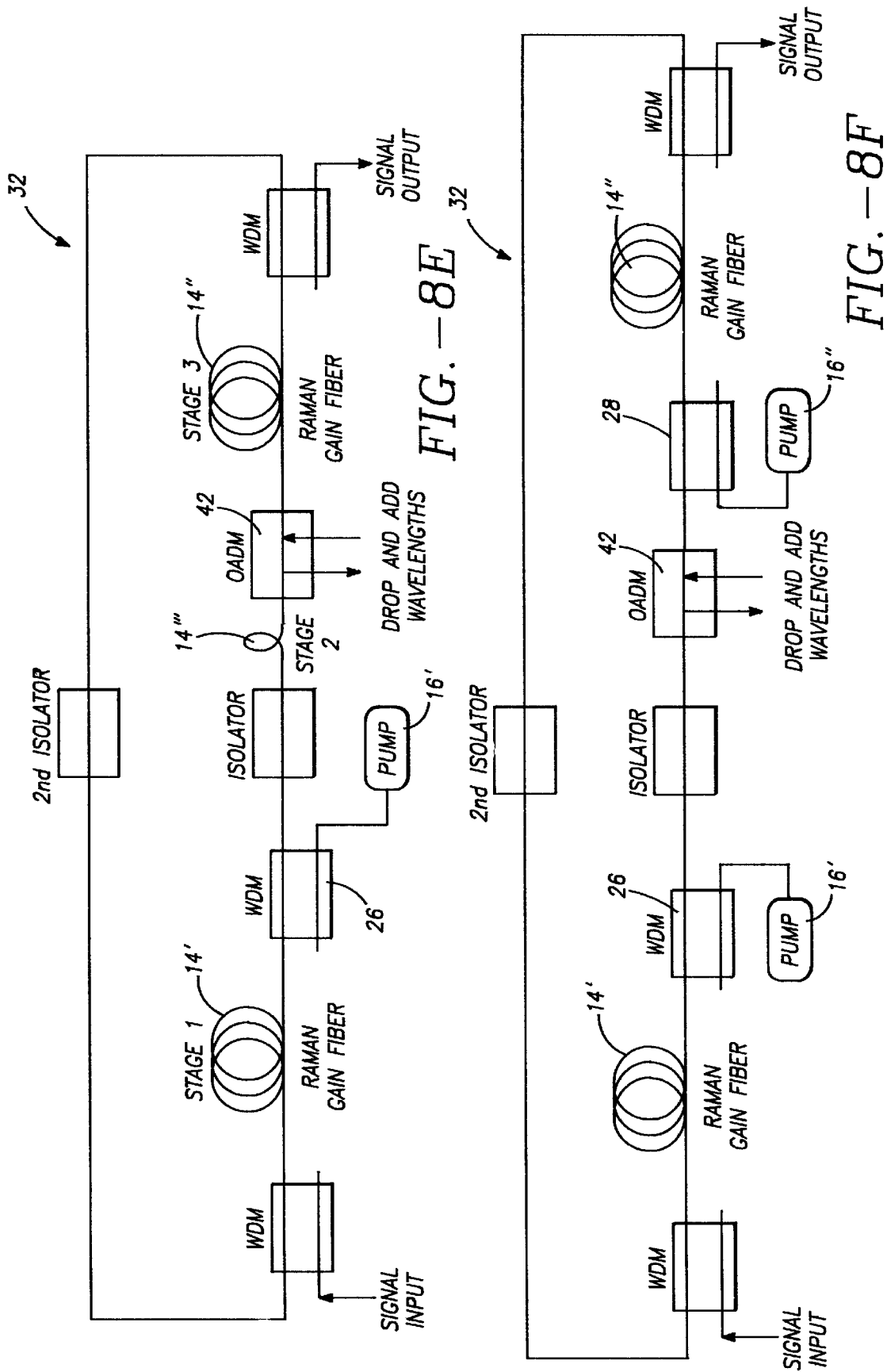

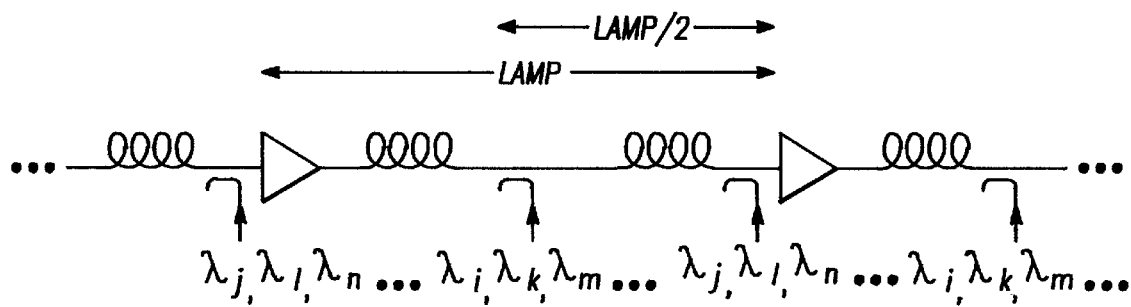
FIG.—9A
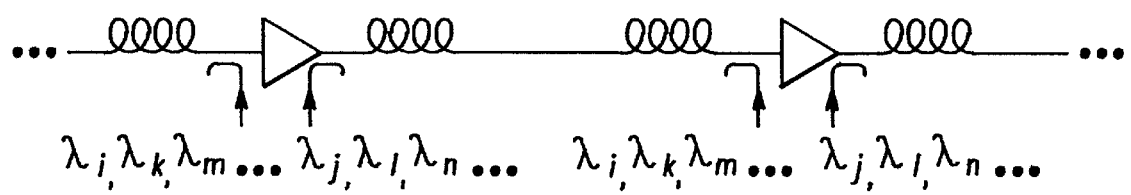
FIG.—9B
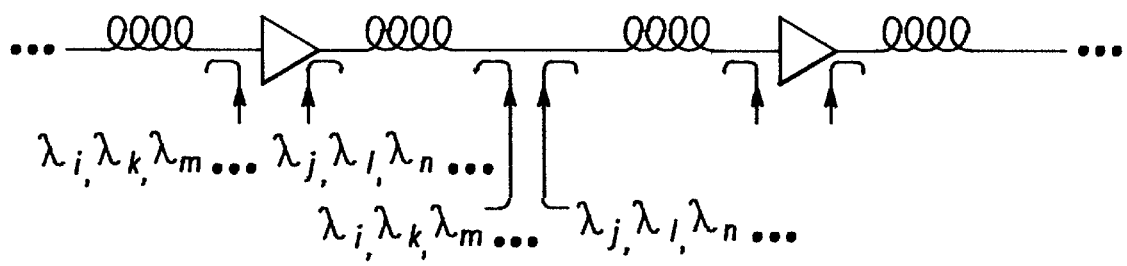
FIG.—9C
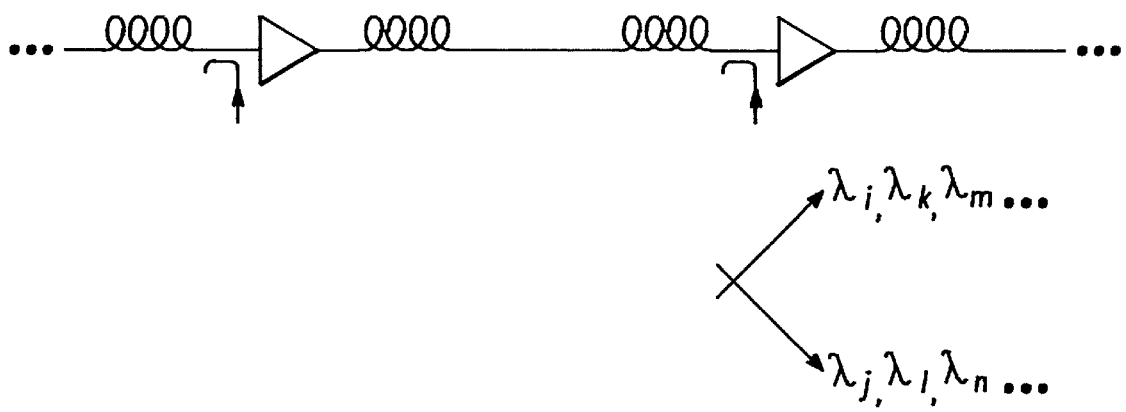
FIG.—9D

HIGH EFFICIENCY RAMAN AMPLIFIER

CROSS REFERENCE TO RELATED APPLICATIONS

This application is a continuation-in-part and claims the benefit of priority from U.S. application Ser. No. 09/768,367, filed Jan. 22, 2001, which is a continuation-in-part of and claims the benefit of priority from U.S. application Ser. No. 09/719,591, filed Dec. 12, 2000, which claims the benefit of PCT Application U.S. Ser. No. 99/13551, filed Jun. 16, 1999, which claims the benefit of No. 60/089,426, filed Jun. 16, 1998, which applications are fully incorporated herein by reference.

BACKGROUND

1. Field of the Invention

This invention relates generally to optical amplifiers, and more particularly to high-efficiency broadband Raman amplifiers with high signal output power.

2. Description of the Related Art

The maximum number of dense wavelength-division-multiplexed (DWDM) signals that can be transmitted over a single optical fiber has been rapidly increasing over the last few years. This trend coupled with an increasing data rate per signal has led to a profound increase in the amount of signal power propagating through such optical fibers. This has created a simultaneous demand for large bandwidth and high output power from the optical amplifiers used in such systems. To produce practical optical amplifiers with high output powers, the efficiency of such amplifiers must be maximized. This reduces the amount of optical pump power required as well as the amount of electrical power and cooling needed.

Erbium-doped fiber amplifiers (EDFAs) are a relatively mature technology and several high-efficiency designs have been disclosed (1999 OFC Technical Digest papers WA6 p16–18 and WA7 p19–21). The amount of bandwidth such amplifiers can produce, however, is fundamentally limited by the physics of the erbium atoms that produce the optical gain in such devices. Raman amplifiers offer an alternative to EDFAs. While many Raman amplifiers have been disclosed, the efficiency of such devices is rarely mentioned. One paper that does discuss efficiency (1999 OFC Technical Digest paper WG5 p114–116) uses a single extremely high-powered pump laser to achieve high optical pump-to-signal conversion efficiency. While the pump-to-signal conversion efficiency of this amplifier was large, the pump laser itself was fairly inefficient requiring much more electrical power and cooling than a laser-diode-pumped design would. The amplifier gain bandwidth was also too limited to be practical for DWDM applications.

There is a need for improved high efficiency Raman amplifiers. There is a further need for efficient broadband Raman amplifiers with sufficient powers that support many dense WDM channels.

SUMMARY

Accordingly, an object of the present invention is to provide an improved Raman amplifier apparatus.

Another object of the present invention is to provide an efficient Raman amplifier apparatus.

Yet another object of the present invention is to provide an efficient, broadband Raman amplifier apparatus.

A further object of the present invention is to provide an efficient, broadband, high power Raman amplifier apparatus.

Another object of the present invention is to provide an efficient broadband Raman amplifier apparatus that is suitable for WDM applications.

These and other objects of the present invention are achieved in an amplifier apparatus that includes an optical transmission line with a Raman amplification region that provides a pump to signal power conversion efficiency of at least 20%. The Raman amplification region is configured to amplify a signal with multiple wavelengths over at least a 30 nm range of wavelengths. A pump source is coupled to the optical transmission line. An input optical signal is amplified in the Raman amplification region and an output signal is generated that has at least 100 mW more power than the input optical signal.

In another embodiment, the present invention is an amplifier apparatus including an optical transmission line with a Raman amplification region that provides a pump to signal power conversion efficiency of at least 20%. A laser diode pump source is coupled to the optical transmission line. An input optical signal is amplified in the Raman amplification region and an output signal has at least 100 mW more power than the input optical signal.

In another embodiment of the present invention, an amplifier system includes at least 32 signal sources that collectively produce an input optical signal. An optical transmission line is coupled to the signal sources. The optical transmission line has a Raman amplification region that provides a pump to signal power conversion efficiency of at least 20%. A pump source is coupled to the optical transmission line. The input optical signal is amplified in the Raman amplification region and the output signal has at least 100 mW more power than the input optical signal.

In another embodiment of the present invention, an amplifier system provides at least 32 signal sources that produce an input optical signal over a wavelength range of at least 30 nm. An optical transmission line is coupled to the signal sources and includes a Raman amplification region. A pump source is coupled to the optical transmission line. The input optical signal is amplified in the Raman amplification region and the output optical signal has at least 100 mW more power than the input optical signal.

In another embodiment of the present invention, an optical signal is amplified in an amplifier apparatus that includes an optical transmission line and a Raman amplification region that provides a pump to signal power conversion efficiency of at least 20%. The optical signal has multiple wavelengths over at least a 30 nm range of wavelengths. The optical signal is introduced into an input of the optical transmission line. The input optical signal is amplified and the output signal has at least 100 mW more power than the input optical signal.

In another embodiment of the present invention, a method of amplifying an optical signal provides an amplifier apparatus that includes an optical transmission line, an input and a Raman amplification region that provides a pump to signal power conversion efficiency of at least 20%. The optical signal is introduced into the input. The Raman amplification region is pumped by at least one diode laser pump source. The input optical signal is amplified and the output signal has at least 100 mW more power than the input optical signal.

In another embodiment of the present invention, a method of amplifying an optical signal provides an amplifier apparatus that includes an optical transmission line with an input and a Raman amplification region. The amplifier apparatus is pumped with at least a first pump beam. At least 32 signals are introduced into the input as an input optical signal. The input optical signal is amplified and an output optical signal is produced with at least 100 mW more power than the input optical signal.

BRIEF DESCRIPTION OF THE DRAWINGS

FIG. 8(e) is a schematic view which illustrates an open loop configuration for the DMRA of the present invention with mid-stage elements.

FIG. 8(f) is a schematic view which illustrates an open loop configuration for the DMRA of the present invention with bi-directional pumping used in a second stage to boost the power gain without severe degradation in noise figure for the composite amplifier.

FIGS. 9(a)–9(d) are schematic diagrams of illustrating hybrid systems of discrete and distributed amplifiers of the present invention.

DETAILED DESCRIPTION

Figure 1:
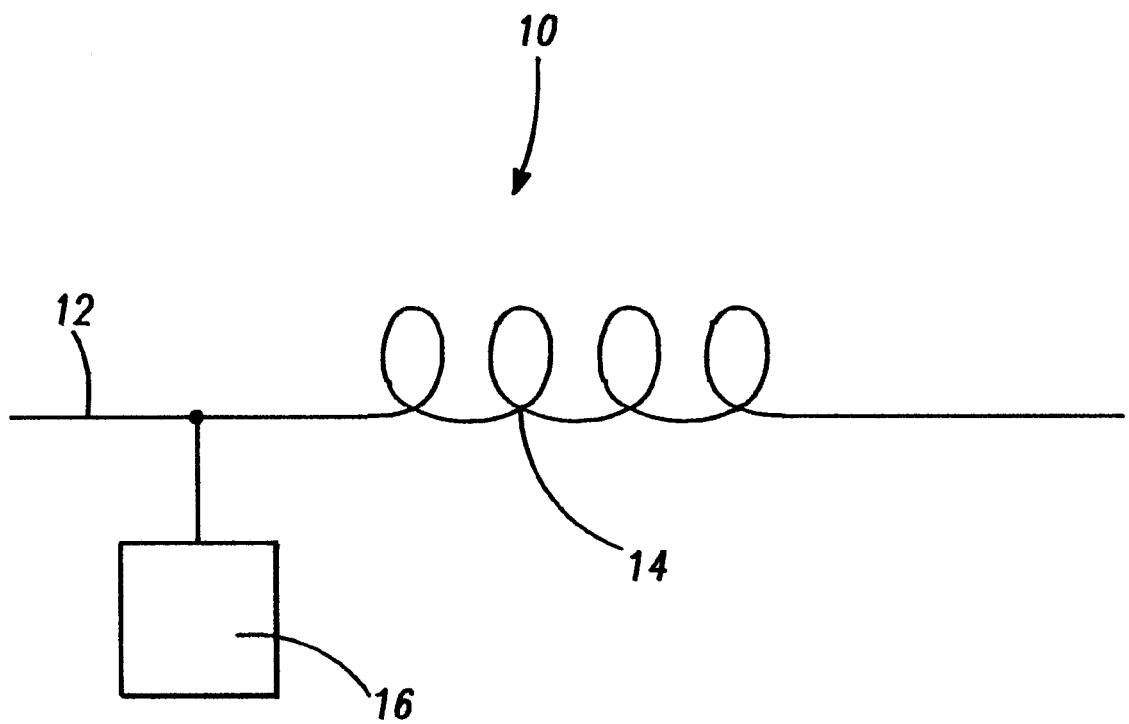
FIG. 1 is a schematic diagram of one embodiment of an amplifier apparatus of the present invention.
Figure 2:
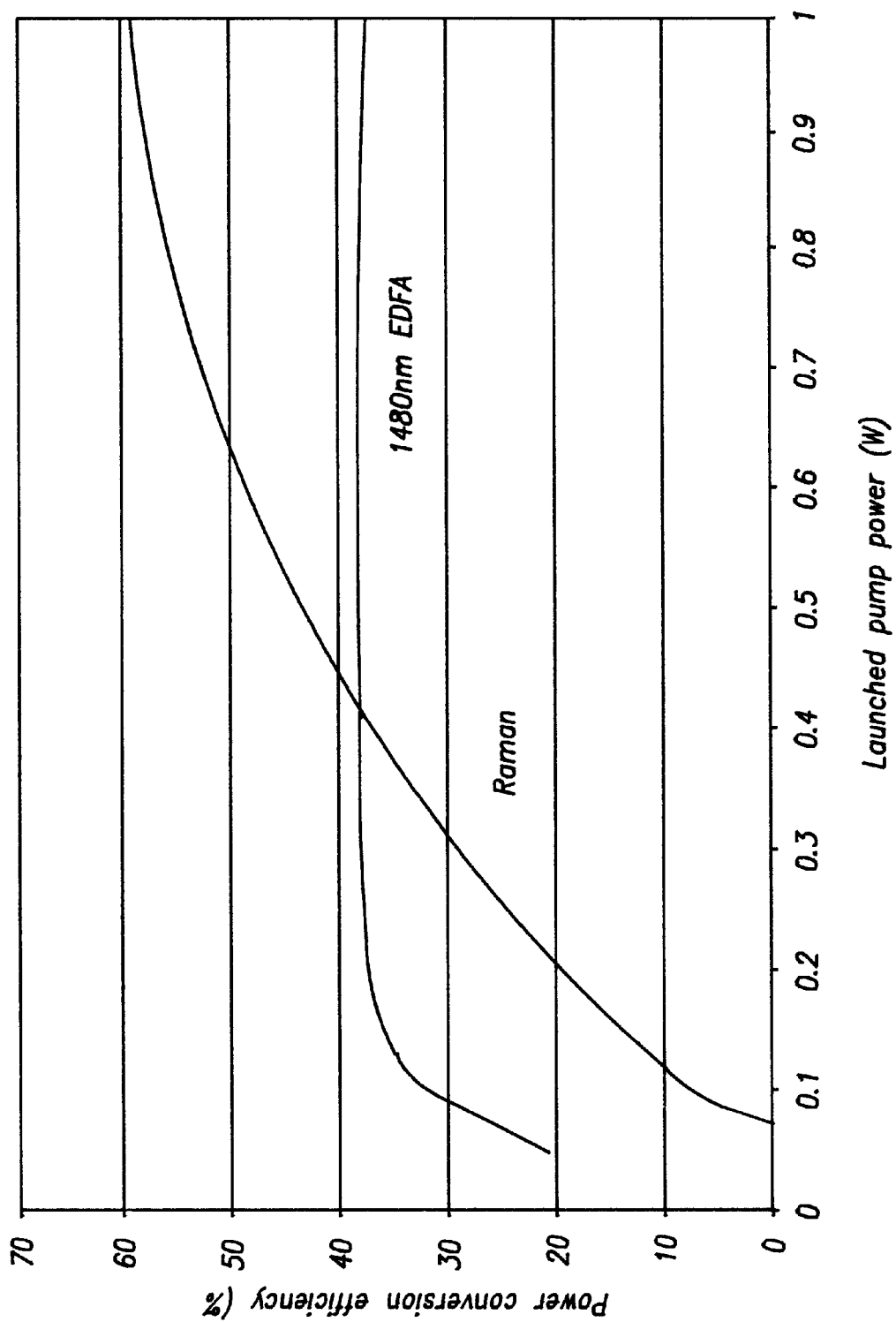
FIG. 2 is a graph that illustrates the overall amplifier efficiency vs pump power of the FIG. 1 apparatus.

Referring to FIG. 1, one embodiment of the present invention is an amplifier apparatus 10 that includes an optical transmission line 12 with an input, an output and a Raman amplification region 14. Raman amplification region 14 can be a discrete Raman amplification region. Amplifier apparatus 10 provides substantially more pump power than an EDFA in order to obtain a comparable level of signal gain. FIG. 2 is a graph that illustrates the overall amplifier efficiency vs pump power. When the ouput power is high, the overall efficiency of amplifier apparatus 10 can exceed that of an EDFA.

Raman amplification region 14 provides a pump to signal power conversion efficiency of at least 20%, more preferably at least 25%., still more preferably at least 30%, still more preferably at least 40% and still more preferably at least 55%.

As the bandwidth of amplifier apparatus 10 increases, more DWDM channels are amplfied and the required output power of amplifier apparatus 10 becomes larger. Preferably, the amplifier noise figure is less than 10 dB for use in telecommunications systems. For purposes of this specification, the pump to signal power conversion efficiency is the signal output power minus the signal input power divided by a pump power.

Raman amplification region 14 amplifies a signal with multiple wavelengths over at least a 30 nm range of wavelengths, more preferably over at least a 50 nm range of wavelengths and still more preferably over at least a 70 nm range of wavelengths. To obtain high-efficiency the optical losses in the components and fiber splices of amplifier apparatus 10 are preferably minimized over the pump and signal wavelength ranges. Raman amplification region 14 is selected to maximize the Raman gain coefficient (1/W km) to loss (1/km) ratio at the chosen pump wavelength(s) and to minimize loss over the signal wavelength range.

Raman amplification region 14 can have a noise figure less than 10 dB over the range of wavelengths of the signal. In one embodiment, the range of wavelengths of the signal is in the range of 1400 to 1650 nm.

A pump source 16 is coupled to optical transmission line 12. The total amplifier pump-to-signal efficiency of amplifier apparatus 10 increases with pump power. The pump-to-signal conversion efficiency is maximized at very high pump powers with relatively short gain fibers (<Leff). This also minimizes the noise figure of amplifier apparatus 10.

Pump source 16 produces a sufficient amount of pump power, typically at least several hundred mW of power, to achieve high efficiency. In one specific embodiment, pump source produces a pump power of at least 450 mW.

Pump source 16 can be one or more laser diodes. Preferably, the laser diodes have high output power, in a single-mode fiber, and a controlled output spectrum that can be achieved, for example with a Bragg grating external cavity output coupler. Additionally, laser diodes can be polarized and include a polarization maintaining output fiber. In one embodiment, two laser diodes are combined at each wavelength with a polarization beam combiner in order to achieve higher output power per wavelength and polarization-independent gain. Several wavelengths can then be combined with wavelength-division multiplexers (WDMs).

An input optical signal to apparatus 10 is in Raman amplification region 16. A corresponding output signal has at least 100 mW more power than the input optical signal. In other embodiments, the output signal has at least 150 mW more power than the input optical signal, or at least 200 mW more power than the input optical signal or at least 250 mW more power than the input optical signal.

At least a portion of transmission line 12 can be a dispersion compensating fiber. The dispersion compensating fiber portion of transmission line 12 can have an absolute magnitude of dispersion of at least 50 ps/nm-km.

Figure 3:
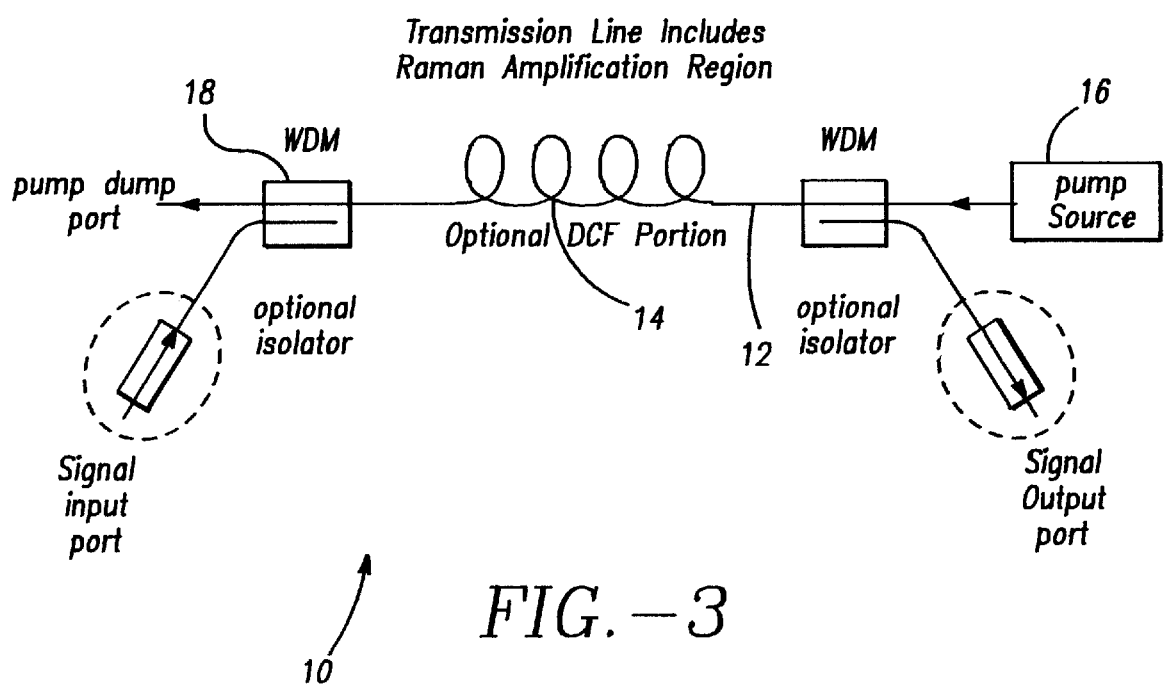
FIG. 3 is a schematic diagram of an embodiment of an amplifier apparatus of the present invention that includes a WDM.
Figure 4:
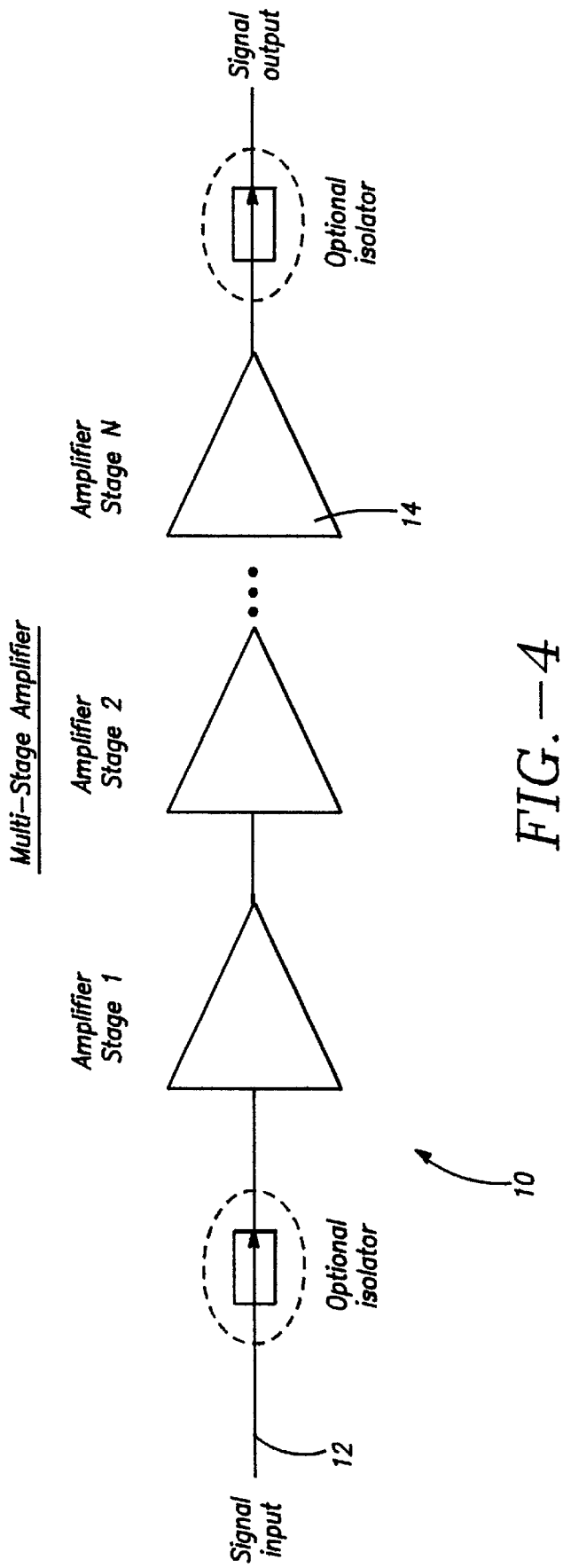
FIG. 4 illustrates a multi-stage amplifier embodiment of the present invention.

As illustrated in FIG. 3, a WDM 18 is coupled to transmission line 12 and pump source 16. Referring now to FIG. 4, amplifier apparatus 10 can be only one stage in a multi-stage amplifier, particularly the stage that is located adjacent to the output.

Figure 5:
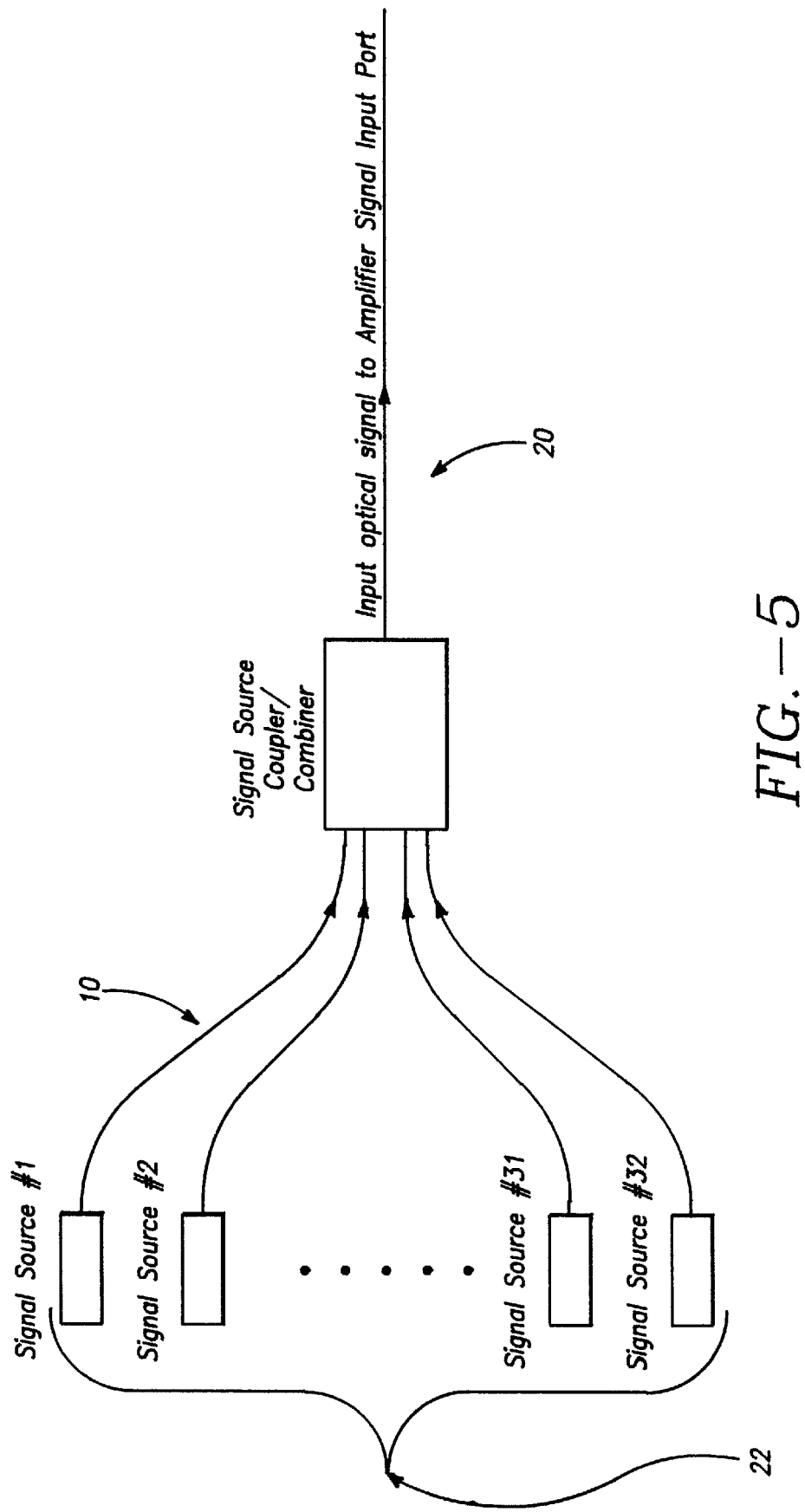
FIG. 5 illustrates an amplifier system embodiment of the present invention that includes at least 32 signal sources.

Another embodiment of the present invention, shown in FIG. 5, is an amplifier system 20 that includes at least 32 signal sources (collectively 22) that produce an input optical signal for amplifier apparatus 10.

In one embodiment of the present invention, amplifier apparatus 10 was created with more than 4 dB of gain over 47 nm using a Lucent DK-30 dispersion compensating fiber as the gain fiber. 1 dB of loss was assumed to be present at both ends of the gain fiber. The gain fiber was pumped with 380 mW at 1472 nm and 1505 nm. Six input signals at 1570, 1580, 1590, 1600, 1610 and 1620 had 15 mW of power and were counter-propagating with respect to the pump wavelengths. The combined output power was 251 mW after passing the 1 dB loss at the end of the gain fiber. The pump to signal conversion efficiency in the gain fiber was [251 mW (×) 1.259 (to correct for 1 dB loss)−90 mW/1.259]/(760 mW/1.259)=40.5%.

In another embodiment, amplifier apparatus 10 had more than 3.2 dB of gain over 105 nm utilizing a Lucent DK-20 dispersion compensating fiber. 1 dB of loss was assumed to be present at both ends of the gain fiber. This fiber was pumped with 250 mW at 1396, 1416, and 1427 nm, 150 mW at 1450 nm, 95 mW at 1472 nm and 75 mW at 1505 nm. Ten input signals at 1520, 1530, 1540, 1550, 1560, 1570, 1580, 1590, 1600 and 1610 nm had 12 mW of power and were counter-propagating with respect to the pump wavelengths. The combined output power was 284 mW after passing the 1 dB loss at the end of the gain fiber. The pump to signal conversion efficiency in the gain fiber is thus [284 mW (×) 1.259(to correct for 1 dB loss)−120 mW/1.259]/(1070 mW/1.259)=30.9%.

Figure 6:
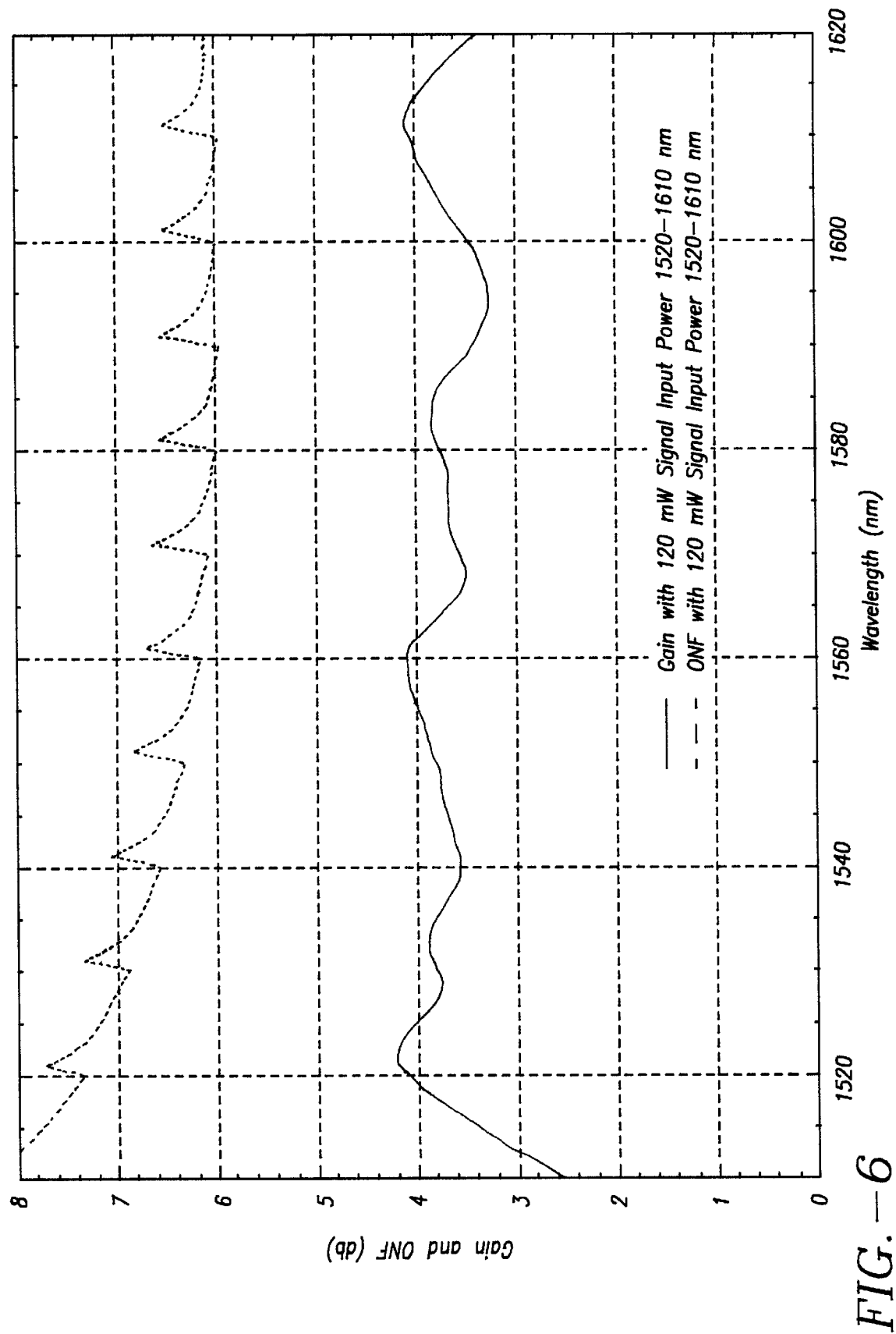
FIG. 6 is a graph illustrating the gain and optical noise figure of the two different embodiments of the present invention.

FIG. 6 is a graph that illustrates the gain and optical noise figure of the two different embodiments of the present invention described in the preceding two paragraphs.

Figure 7:
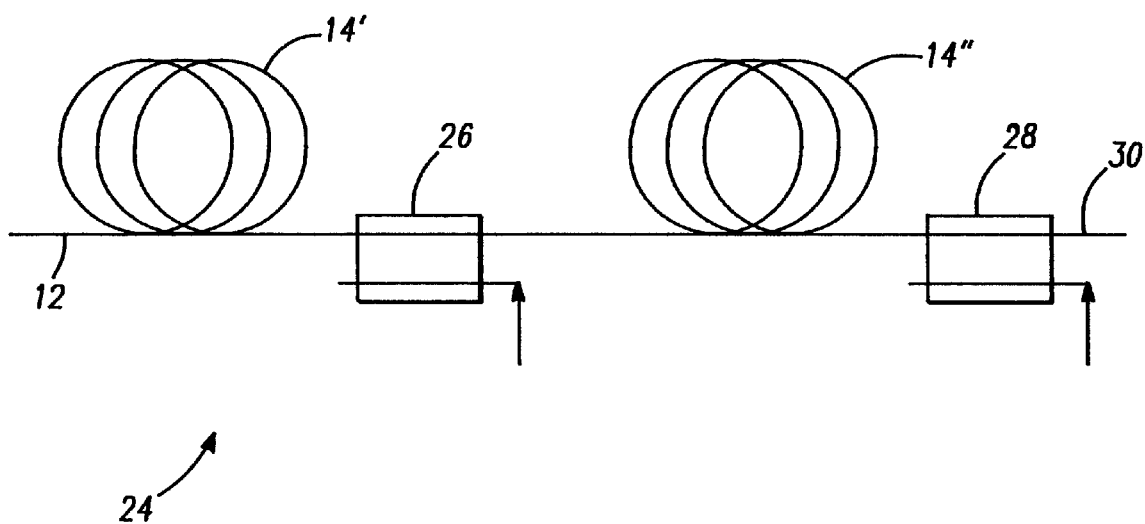
FIG. 7 illustrates an all band Raman amplifier embodiment of the present invention.

Amplifier apparatus 10 can be utilized as an all band Raman amplifier. FIG. 7 is a schematic diagram of one embodiment of an all band Raman amplifier 24 that includes transmission line 12 with two Raman amplification regions 14' and 14". As illustrated, WDM's 26 and 28 are provided. A length of each Raman amplification region 14' and 14" can be at least 200 m or at least 1 kilometer. Shorter signal wavelengths can receive more gain in one of Raman amplification regions 14', 14" than in the other. One or both of Raman amplification regions 14' and 14" can include dispersion compensating fiber. A lossy member can be positioned between the Raman amplification regions 14' and 14". The lossy member can include at least one of an add/drop multiplexer, a gain equalization element, an optical isolator or a dispersion compensating element.

WDM 28 receives a first set of pump wavelengths provided by a first pump source and WDM 26 receives a second set of pump wavelengths which can provide gain to the optical signal and extract optical energy from at least a portion of the first set of pump wavelengths. The second set of wavelengths is provided by a second pump source.

A length of each Raman amplification region 14' and 14" can be controllable to adjust gain flatness as a function of optical signal wavelengths. WDM 26 can substantially pass signal wavelengths as well as at least a portion of the first set of pump wavelengths between the two Raman amplification regions 14' and 14". Substantially passing signal wavelengths will be understood to mean that at least a majority of the power passes between Raman amplification regions 14' and 14". WDM 28 can be configured to substantially pass the optical signal between Raman amplification regions 14 and an output 30. The first and second sets of pump wavelengths can propagate in a downstream direction towards the input in transmission line 12. A gain flatness of all band Raman amplifier 24 can be optimized by a gain flattening filter, and/or by pump wavelengths, pump powers, the number of pumps and the lengths of Raman gain fibers 1410 and 1420.

FIGS. 8(a) through 8(f) illustrate different open loop configurations for a dispersion-managing Raman amplifier 32 that provides dispersion compensation for transmission fiber 12.

Figure 8A:
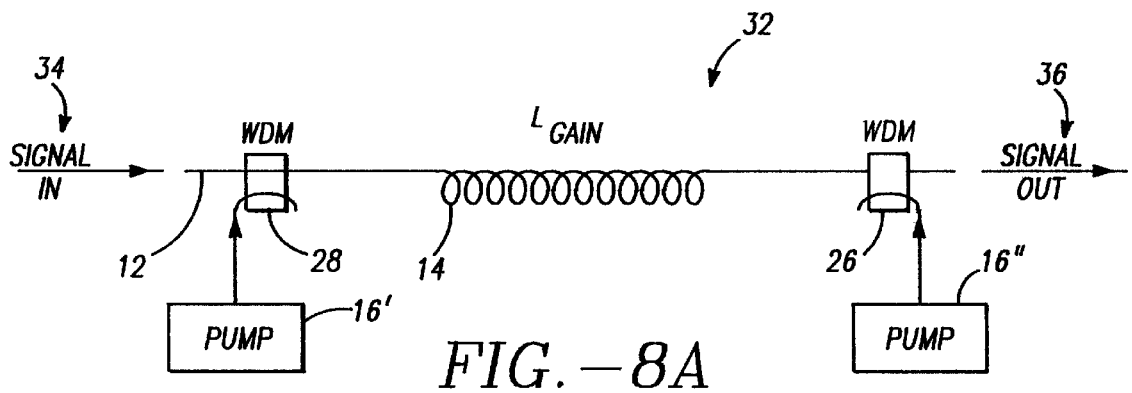
FIG. 8(a) is a schematic diagram which illustrates an open loop configuration for a dispersion-managing Raman amplifier (DMRA) embodiment of the present invention using a bi-directionally pumped gain fiber.
Figure 8B:
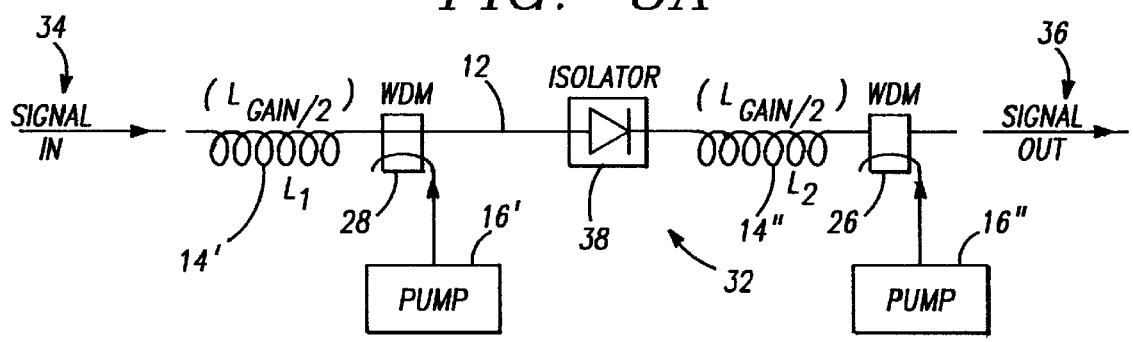
FIG. 8(b) is a schematic diagram which illustrates an open loop configuration for a DMRA embodiment of the present invention with the gain fiber split in two parts and counter-propagation for the pump and signal.

Referring now to FIG. 8(a), transmission fiber 12 is a bi-directionally pumped gain fiber. An optical signal is input from an input port 34 to transmission line 12. Transmission line 12 is pumped bi-directionally by a pumping light generated by a pumping sources 16' and 16". Transmission line 12 is single spatial mode at both the signal and pump wavelengths.

A counter-propagating pump and signal geometry can avoid coupling any pumping light fluctuations to the amplified signal. The open loop configuration of FIG. 8(b) achieves this by splitting transmission line 12 into two Raman gain regions 14' and 14" with counter-propagation of the pump and sign. Pumps 16' and 16" are used to pump each segment, and WDM's 28 and 26 are used to couple in pumps 16' and 16" respectively. An optical isolator 38 is placed between Raman gain regions 14' and 14" to avoid any interference between the pump energy from 16" and 16' which might occur at WDM 28. Isolator 38 can be replaced by other elements including but not limited to, a gain equalization element and/or an optical add/drop multiplexer. Because of the high insertion loss associated with add/drop multiplexers, an effective isolation can be achieved between the pumps in Raman gain regions 14' and 14".

Figure 8C:
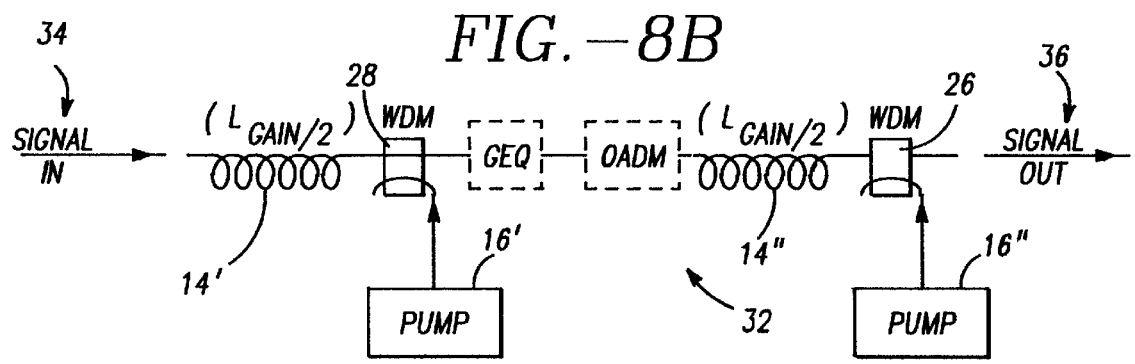
FIG. 8(c) is a schematic diagram which illustrates an open loop configuration for a DMRA embodiment of the present invention with additional elements placed between two segments of the amplifier.

Referring now to FIG. 8(c), gain equalization can be performed at the mid-stage access in two-section transmission line 12. This wavelength dependency or nonuniformity of the gain band may have little impact on single-channel transmission and can render amplifier 32 unsuitable for multichannel operation through a cascade of amplifiers. As channels at different wavelengths propagate through a chain of amplifiers, they accumulate increasing discrepancies between them in terms of gain and signal-to-noise ratio. Gain-flattening elements can significantly increase the usable bandwidth of a long chain of amplifiers.

Figure 8D:
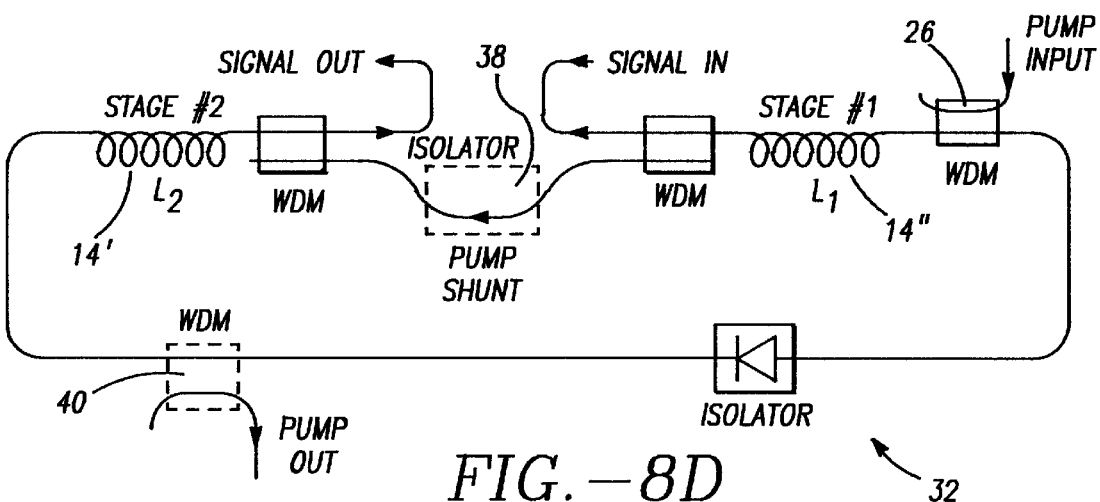
FIG. 8(d) is a schematic view which illustrates an open loop configuration for a DMRA of the present invention with the pump inserted into a first stage counter-propagating and then sent to a second stage of the amplifier.

An alternate configuration for the gain fiber pumping is also illustrated in FIG. 8(d). In this embodiment, transmission line 12 is split into two lengths. Pump 16' is introduced into Raman gain region 14" with WDM 26. The pump is inserted into the first stage in a counter-propagating manner and then to the second stage. The pump is shunted around where the signal is introduced and extracted. The pump then enters Raman gain region 14'. An optional WDM 40 may be used to remove any remaining pump and minimize damage to isolator 38. Isolator 38 can be placed between Raman gain sections 14' and 14". This configuration can be characterized by one or more of the following: (i) the first stage can be a low-noise pre-amplifier, (ii) the isolator in the signal path further reduces noise, (iii) the second stage can be a power amplifier, depleting pump power, (iv) a better noise figure since weak signal sees higher gain, (v) better gain saturation performance, and (vi) prevention of double Rayleigh scattering. At the mid-stage other elements such as add/drop multiplexers can also be placed.

FIG. 8(e) illustrates a two-stage embodiment with an optical add/drop multiplexer 42 at the mid-stage. The embodiments of FIGS. 8(d) and 8(e) may also be used in where dispersion compensation fiber is not used as the gain fiber. Bi-directional pumping in the second stage of the two-stage amplifier can increase the power amplifier gain without severely impacting the noise figure of the composite amplifier illustrated as in the bi-directional pumping embodiment of FIG. 8(f).

FIGS. 9(a) through 9(d) illustrate different configurations of hybrid systems with discrete and distributed amplifiers of the present invention. FIG. 9(a) illustrates an embodiment where distributed amplification is added with counter-propagating Raman pumps. Alternate band pumps are added at different spatial points to minimize nonlinear interaction between pumps. In FIG. 9(b), bi-directional pumping is provided. Alternate band Raman pumps can be launched in different directions to minimize interaction between pumps. The embodiment of FIG. 9(c) provides bi-directional pumping and mid-stage access which provides more uniform pumping. In FIG. 9(d), counter-propagating pumps are included without mid-stage access. Alternate pump bands can be launched that are orthogonally polarized. In this embodiment the Raman gain for cross-polarized light is about one-tenth the strength of Raman gain for co-polarized light.

FIGS. 9(a)–9(d) illustrate different pumping configurations for distributed Raman gain, or amplification of the present invention. FIG. 9(a) illustrates an embodiment with a counter-propagating pumping scheme with mid-stage access. Alternate pump bands can be spatially dispersed. FIG. 9(b) illustrates an embodiment with bi-directionally pumping without mid-stage access. Alternate pumps can be launched in different directions. In the embodiment of FIG. 9(c), bi-directional pumping and mid-stage access are provided with a result that the gain can be more spatially uniform. In FIG. 9(d) illustrates an embodiment with a launch of alternate pump bands that are cross-polarized.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An amplifier apparatus, comprising:
   an optical transmission me comprising an input to receive an input optical signal, an output that passes an output optical signal and a Raman amplification region of the optical transmission line, the Raman amplification region comprising a Raman amplification region input and a Raman amplification region output, wherein each of the Raman amplification region input and the Raman amplification on region output comprise a coupling loss of no more than one (1) decibel, wherein the Raman amplification region is configured to amplify a signal with multiple wavelengths over at least a 30 nm range of wavelengths, and wherein the Raman amplification region comprises an attenuation of no more than one (1) decibel per kilometer for at least one of the wavelengths of the input optical signal;
   a pump source coupled to the optical transmission line, the input optical signal being amplified in the Raman amplification region and the output signal having at least 100 mW more power than the input optical signal, wherein the Raman amplification region comprises a cut-off wavelength that is shorter than a ump signal wavelength generated by the pump source; and
   wherein at least a combination of a selection of the coupling losses, the attenuation, and the cut-off wavelength associated with the Raman amplification region operate to provide a pump to signal power conversion efficiency of at least 20% for the Raman amplification region.

2. The apparatus of claim 1, wherein the output signal has at least 150 mW more power than the input optical signal.

3. The apparatus of claim 1, wherein the output signal has at least 200 mW more power than the input optical signal.

4. The apparatus of claim 1, wherein the output signal has at least 250 mW more power than the input optical signal.

5. The apparatus of claim 1, wherein the Raman amplification region provides a pump to signal power conversion efficiency of at least 25%.

6. The apparatus of claim 1, wherein the Raman amplification region provides a pump to signal power conversion efficiency of at least 30%.

7. The apparatus of claim 1, wherein the Raman amplification region provides a pump to signal power conversion efficiency of at least 40%.

8. The apparatus of claim 1, wherein the Raman amplification region provides a pump to signal power conversion efficiency of at least 55%.

9. The apparatus of claim 1, wherein the Raman amplification region is configured to amplify a signal with multiple wavelengths over at least a 50 nm range of wavelengths.

10. The apparatus of claim 1, wherein the Raman amplification region is configured to amplify a signal with multiple wavelengths over at least a 70 nm range of wavelengths.

11. The apparatus of claim 1, wherein the pump to signal power conversion efficiency is a signal output power minus a signal input power divided by a pump power.

12. The apparatus of claim 1, wherein the pump source generates a pump power of at least 450 mW.

13. The apparatus of claim 1, wherein the optical transmission line comprises a discrete Raman gain medium, and wherein the discrete Raman gain medium comprises the Raman amplification region.

14. The apparatus of claim 1, wherein the Raman amplification region has a noise figure less than 10 dB over the a least 30 nm range of wavelengths of the signal.

15. The apparatus of claim 1, wherein the at least 30 nm range of wavelengths of the signal is in the range of 1400 to 1650 nm.

16. The apparatus of claim 1, wherein at least a portion of the transmission line is a dispersion compensating fiber.

17. The apparatus of claim 16, wherein the dispersion compensating fiber has an absolute magnitude of dispersion of at least 50 ps/nm-km.

18. The apparatus of claim 1, further comprising:
   a WDM coupled to the transmission line and the pump source.

19. The apparatus of claim 1, wherein the pump source is a laser diode pump source.

20. The apparatus of claim 1, wherein the pump source is a plurality of laser diode pump sources.

21. The apparatus of claim 1, wherein the apparatus is at least one stage in a multi-stage amplifier.

22. The apparatus of claim 1, wherein the apparatus is a last stage in a multi-stage amplifier.

23. The apparatus of claim 22, wherein the last stage is coupled to an output of the multi-stage amplifier.

24. An amplifier apparatus, comprising:
   an optical transmission line comprising an input to receive an input optical signal comprising wavelengths over range of at least 30 nanometers, an output that passes an output optical signal and a Raman amplification region of the optical transmission line, the Raman amplification region comprising a Raman amplification region input and a Raman amplification region output, wherein each of the Raman amplification region input and the Raman amplification region output comprise a coupling loss of no more than one (1) decibel, and wherein the Raman amplification region comprises an attenuation of no more than one (1) decibel per kilometer for at least one of the wavelengths of the input optical signal;

a laser diode pump source coupled to the optical transmission line, the input optical signal being amplified in the Raman amplification region such that the output signal has at least 100 mW more power than the output signal would have without the amplification in the Raman amplification region, wherein he Raman amplification region comprises a cut-off wavelength that is shorter than a pump signal wavelength generated by the laser diode pump source; and wherein at least a combination of a selection of the coupling losses, the attenuation, and the cut-off wavelength associated with the Raman amplification region operate to provide a pump to signal power conversion efficiency of at least 20% for the Raman amplification region.

25. The apparatus of claim 24, wherein the output signal has at least 150 mW more power than the output signal would have without the amplification in the Raman amplification region.

26. The apparatus of claim 24, wherein the output signal has at least 200 mW more power than the output signal would have without the amplification in the Raman amplification region.

27. The apparatus of claim 24, wherein the output signal has at least 250 mW more power than the output signal would have without the amplification in the Raman amplification region.

28. The apparatus of claim 24, wherein the Raman amplification region provides a pump to signal power conversion efficiency of at least 25%.

29. The apparatus of claim 24, wherein the Raman amplification region provides a pump to signal power conversion efficiency of at least 30%.

30. The apparatus of claim 24, wherein the Raman amplification region provides a pump to signal power conversion efficiency of at least 40%.

31. The apparatus of claim 24, wherein the Raman amplification region provides a pump to signal power conversion efficiency of at least 55%.

32. The apparatus of claim 24, wherein the Raman amplification region is configured to amplify a signal with multiple wavelengths over at least a 30 nm range of wavelengths.

33. The apparatus of claim 24, wherein the Raman amplification region is configured to amplify a signal with multiple wavelengths over at least a 50 nm range of wavelengths.

34. The apparatus of claim 24, wherein the Raman amplification region is configured to amplify a signal with multiple wavelengths over at least a 70 nm range of wavelengths.

35. The apparatus of claim 24, wherein the pump to signal power conversion efficiency is a signal output power minus a signal input power divided by a pump power.

36. The apparatus of claim 24, wherein the pump source generates a pump power of at least 450 mW.

37. The apparatus of claim 24, wherein the optical transmission line comprises a discrete Raman gain medium, and wherein the discrete Raman gain medium comprises the Raman amplification region.

38. The apparatus of claim 32, wherein the Raman amplification region has a noise figure less than 10 dB over the least 30 nm range of wavelengths of the signal.

39. The apparatus of claim 32, wherein the at least 30 nm range of wavelengths of the signal is in the range of 1400 to 1650 nm.

40. The apparatus of claim 24, wherein at least a portion of the transmission line is a dispersion compensating fiber.

41. The apparatus of claim 40, wherein the dispersion compensating fiber has an absolute magnitude of dispersion of at least 50 ps/nm-km.

42. The apparatus of claim 24, further comprising:
  a WDM coupled to the transmission line and the laser diode pump source.

43. The apparatus of claim 24, wherein the laser diode pump source is a plurality of laser diode pump sources.

44. The apparatus of claim 24, wherein the apparatus is at least one stage in a multi-stage amplifier.

45. The apparatus of claim 24, wherein the apparatus is a last stage in a multi-stage amplifier.

46. The apparatus of claim 45, wherein the last stage is coupled to an output of the multi-stage amplifier.

47. An amplifier system, comprising:
  at least 32 signal sources coupled to produce an input optical signal comprising wavelengths over a range of at least 30 nanometers, at least a portion of the signal sources producing signals of different wavelengths;

an optical transmission line coupled to the signal sources comprising an input to receive an input optical signal, an output that passes an output signal and a Raman amplification region of the optical transmission line, the Raman amplification region comprising a Raman amplification region input and a Raman amplification region output, wherein each of the Raman amplification region input and the Raman amplification region output comprise a coupling loss of no more than one (1) decibel, and wherein the Raman amplification region comprises an attenuation of no more than one (1) decibel per kilometer for at least one of the wavelengths of the input optical signal;

a pump source couple to the optical transmission line, the input optical signal being amplified in the Raman amplification region such that the output optical signal has at least 100 mW more power than the input optical signal, wherein the Raman amplification region comprises a cut-off wavelength that is shorter than a pump signal wavelength generated by the pump source; and wherein at least a combination of a selection of the coupling losses, the attenuation, and the cut-off wavelength associated with the Raman amplification region operate to provide a pump to signal power conversion efficiency of at least 20% for the Raman amplification region.

48. The system of claim 47, wherein the output signal has at least 150 mW more power than the input optical signal.

49. The system of claim 47, wherein the output signal has at least 200 mW more power than the input optical signal.

50. The system of claim 47, wherein the output signal has at least 250 mW more power than the input optical signal.

51. The system of claim 47, wherein the Raman amplification region provides a pump to signal power conversion efficiency of at least 25%.

52. The system of claim 47, wherein the Raman amplification region provides a pump to signal power conversion efficiency of at least 30%.

53. The system of claim 47, wherein the Raman amplification region provides a pump to signal power conversion efficiency of at least 40%.

54. The system of claim 47, wherein the Raman amplification region provides a pump to signal power conversion efficiency of at least 55%.

55. The system of claim 47, wherein the at least 32 signal sources is coupled to produce a signal with multiple wavelengths over at least a 30 nm range of wavelengths.

56. The system of claim 47, wherein the Raman amplification region is configured to amplify a signal with multiple wavelengths over at least a 50 nm range of wavelengths.

57. The system of claim 47, wherein the Raman amplification region is configured to amplify a signal with multiple wavelengths over at least a 70 nm range of wavelengths.

58. The system of claim 47, wherein the pump to signal power conversion efficiency is a signal output power minus signal input power divided by a pump power.

59. The system of claim 47, wherein the pump source generates a pump power of at least 450 mW.

60. The system of claim 47, wherein the optical transmission line comprises a discrete Raman gain medium, and wherein the discrete Raman gain medium comprises the Raman amplification region.

61. The system of claim 47, wherein the Raman amplification region comprises a noise figure of less than 10 dB over at least a 30 nm range of wavelengths of the signal.

62. The system of claim 47, wherein the input optical signal comprises at least a 30 nm range of wavelengths, and herein the at least a 30 nm range of wavelengths is in the range of 1400 to 1650 nm.

63. The system of claim 47, wherein at least a portion of the transmission line is a dispersion compensating fiber.

64. The system of claim 63, wherein the dispersion compensating fiber has an absolute magnitude of dispersion of at least 50 ps/nm-km.

65. The system of claim 47, further comprising:
a WDM coupled to the transmission line and the pump source.

66. The system of claim 47, wherein the pump source is a laser diode pump source.

67. The system of claim 47, wherein the pump source is a plurality of laser diode pump sources.

68. An amplifier system, comprising:
at least 32 signal sources coupled to produce an input optical signal over a wavelength range of at least 30 nm, at least a portion of the signal sources producing signals of different wavelengths;
an optical transmission line coupled to the signal sources comprising an input to receive an input optical signal, an output that passes an output optical signal and a Raman amplification region of the optical transmission line, the Raman amplification region comprising a Raman amplification region input and the Raman amplification region output, wherein each of the Raman amplification region input and the Raman amplificationregion output comprise a coupling loss of no more than one (1) decibel, and wherein the Raman amplification region comprises an attenuation of no more than one (1) decibel per kilometer for at least one of the wavelengths of the input optical signal;
a pump source couple to the optical transmission line, the input optical signal being amplified in the Raman amplification region such that the output signal has at least 100 mW more power than the output signal would have without the amplification in the Raman amplification region, wherein he Raman amplification region comprises a cut-off wavelength that is shorter than a pump signal wavelength generated by the pump source; and
wherein at least a combination of a selection of the coupling losses, the attenuation, and the cut-off wavelength associated with the Raman amplification region operate to provide a pump to signal power conversion efficiency of at least 20% for the Raman amplification region.

69. The system of claim 68, wherein the output signal has at least 150 mW more power than the output signal would have without the amplification in the Raman amplification region.

70. The system of claim 68, wherein the output signal has at least 200 mW more power than the output signal would have without the amplification in the Raman amplification region.

71. The system of claim 68, wherein the output signal has at least 250 mW more power than the output signal would have without the amplification in the Raman amplification region.

72. The system of claim 68, wherein the Raman amplification region provides a pump to signal power conversion efficiency of at least 22%.

73. The system of claim 68, wherein the Raman amplification region provides a pump to signal power conversion efficiency of at least 25%.

74. The system of claim 68, wherein the Raman amplification region provides a pump to signal power conversion efficiency of at least 30%.

75. The system of claim 68, wherein the Raman amplification region provides a pump to signal power conversion efficiency of at least 40%.

76. The system of claim 68, wherein the Raman amplification region provides a pump to signal power conversion efficiency of at least 55%.

77. The system of claim 68, wherein the Raman amplification region is configured to amplify a signal with multiple wavelengths over at least a 50 nm range of wavelengths.

78. The system of claim 68, wherein the Raman amplification region is configured to amplify a signal with multiple wavelengths over at least a 70 nm range of wavelengths.

79. The system of claim 68, wherein the Raman amplification region comprises a pump to signal power conversion efficiency, and wherein the pump to signal power conversion efficiency is a signal output power minus a signal input power divided by a pump power.

80. The system of claim 68, wherein the pump source generates a pump power of at least 450 mW.

81. The system of claim 68, wherein the optical transmission line comprises a discrete Raman gain medium, and wherein the discrete Raman gain medium comprises the Raman amplification region.

82. The system of claim 68, wherein the Raman amplification region has a noise figure less than 10 dB over the at least 30 nm range of wavelengths of the signal.

83. The system of claim 68, wherein the at least 30 nm range of wavelengths of the signal is in the range of 1400 to 1650 nm.

84. The system of claim 68, wherein at least a portion of the transmission line is a dispersion compensating fiber.

85. The system of claim 84, wherein the dispersion compensating fiber has an absolute magnitude of dispersion of at least 50 ps/nm-km.

86. The system of claim 68, further comprising:
a WDM coupled to the transmission line and the pump source.

87. The system of claim 68, wherein the pump source is a laser diode pump source.

88. The system of claim 68, wherein the pump source is a plurality of laser diode pump sources.

89. A method of amplifying an optical signal with multiple wavelengths over at least a 30 nm range of wavelengths, comprising:
introducing an input optical signal comprising wavelengths ranging over at least 30 nanometers to an amplifier apparatus including a Raman amplification, the Raman amplification region comprising a Raman amplification region input and a Raman amplification region output, wherein each of the Raman amplification region input and the Raman amplification region output comprise a coupling loss of no more than one (1) decibel, wherein the Raman amplification region comprise an attenuation of no more than one (1) decibel per kilometer for at least one of the wavelength of the input optical signal, and wherein the Raman amplification region comprises a cut off wavelength that is shorter than a pump signal wavelength received by the Raman amplification region;
amplifying the input optical signal such that a signal output from the Raman amplification region has at least 100 mW more power than the input signal; and
wherein at least a combination of a selection of the coupling losses, the attenuation, and the cut-off wavelength associated with the Raman amplification region operate to provide a pump to signal power conversion efficiency of at least 20% for the Raman amplification region.

90. The method of claim 89, wherein the output signal has at least 150 mW more power than the input signal.

91. The method of claim 89, wherein the output signal has at least 200 mW more power than the input signal.

92. The method of claim 89, wherein the output signal has at least 250 mW more power than the input signal.

93. A method of amplifying an optical signal, comprising:
introducing an input optical signal comprising wavelengths ranging over at least 30 nanometers to an amplifier apparatus including a Raman amplification region, the Raman amplification region comprising a Raman amplification region input and a Raman amplification region output, wherein each of the Raman amplification region input and the Raman amplification region output comprise a coupling loss of no more than one (1) decibel, and wherein the Raman amplification region comprises an attenuation of no more than one (1) decibel per kilometer for at least one of the wavelengths of the input optical signal;
pumping the Raman amplification region with at least one diode laser pump source, wherein the Raman amplification ion region comprises a cut off wavelength that is shorter than a pump signal wavelength generated by the at least one laser pump source;
amplifying the input optical signal such that a signal output from the Raman amplification region has at least 100 mW more power than the output signal would have without the amplification in the Raman amplification region; and
wherein at least a combination of a selection of the coupling losses, the attenuation, and the cut-off wavelength associated with the Raman amplification region operate to provide a pump to signal power conversion efficiency of at least 20% for the Raman amplification region.

94. The method of claim 93, wherein the output signal has at least 150 mW more power than the output signal would have without the amplification in the Raman amplification region.

95. The method of claim 93, wherein the output signal has at least 200 mW more power than the output signal would have without the amplification in the Raman amplification region.

96. The method of claim 93, wherein the output signal has at least 250 mW more power than the output signal would have without the amplification in the Raman amplification region.

97. The method of claim 93, wherein the Raman amplification region provides a pump to signal power conversion efficiency of at least 25%.

98. The method of claim 93, wherein the Raman amplification region provides a pump to signal power conversion efficiency of at least 30%.

99. The method of claim 93, wherein the Raman amplification region provides a pump to signal power conversion efficiency of at least 40%.

100. The method of claim 93, wherein the Raman amplification region provides a pump to signal power conversion efficiency of at least 55%.

101. The method of claim 93, wherein the Raman amplification region is configured to amplify a signal with multiple wavelengths over at least a 50 nm range of wavelengths.

102. The method of claim 93, wherein the Raman amplification region is configured to amplify a signal with multiple wavelengths over at least a 70 nm range of wavelengths.

103. A method of amplifying an optical signal, comprising:
introducing an optic signal comprising wavelengths ranging over at least 30 nanometers to an amplifier apparatus including a Raman amplification region, the Raman amplification region comprising a Raman amplification region input and a Raman amplification region output, wherein each of the Raman amplification region input and the Raman amplification region output comprise a coupling loss of no more than one (1) decibel;
pumping the amplified apparatus with at least a first pump beam, wherein the Raman amplification region comprise a cut off wavelength that is shorter than a pump signal wavelength of the first pump beam;
introducing at least 32 signals into the amplifier as an input optical signal, wherein the Raman amplification region comprises an attenuation of no more than one (1) decibel per kilometer for at least one of the wavelengths of the input optical signal;
amplifying the input optical signal in the Raman amplification region;
producing an output signal with at least 100 mW more power than the output signal would have without the amplification in the Raman amplification region; and
wherein at least a combination of a selection of the coupling losses, the attenuation, and the cut-off wavelength associated with the Raman amplification region operate to provide a pump to signal power conversion efficiency of at least 20% for the Raman amplification region.

104. The method of claim 103, wherein the output signal has at least 150 mW more power than the output signal would have without the amplification in the Raman amplification region.

105. The method of claim 103, wherein the output signal has at least 200 mW more power than the output signal would have without the amplification in the Raman amplification region.

106. The method of claim 103, wherein the output signal has at least 250 mW more power than the output signal would have without the amplification in the Raman amplification region.

107. The method of claim 103, wherein the Raman amplification region provides a pump to signal power conversion efficiency of at least 22%.

108. The method of claim 103, wherein the Raman amplification region provides a pump to signal power conversion efficiency of at least 25%.

109. The method of claim 103, wherein the Raman amplification region provides a pump to signal power conversion efficiency of at least 30%.

110. The method of claim 103, wherein the Raman amplification region provides a pump to signal power conversion efficiency of at least 40%.

111. The method of claim 103, wherein the Raman amplification region provides a pump to signal power conversion efficiency of at least 55%.

112. The method of claim 103, wherein the Raman amplification region is configured to amplify a signal with multiple wavelengths over at least a 30 nm range of wavelengths.

113. The method of claim 103, wherein the Raman amplification region is configured to amplify a signal with multiple wavelengths over at least a 50 nm range of wavelengths.

114. The method of claim 103, wherein the Raman amplification region is configured to amplify a signal with multiple wavelengths over at least a 70 nm range of wavelengths.

115. The apparatus of claim 1, wherein the optical transmission line comprises a distributed Raman gain medium, and wherein the distributed Raman gain medium comprises the Raman amplification region.

116. The apparatus of claim 24, wherein the optical transmission line comprises a distributed Raman gain medium, and wherein the distributed Raman gain medium comprises the Raman amplification region.

117. The system of claim 47, wherein the optical transmission line comprises a distributed Raman gain medium, and wherein the distributed Raman gain medium comprises the Raman amplification region.

118. The system of claim 68, wherein the optical transmission line comprises a distributed Raman gain medium, and wherein the distributed Raman gain medium comprises the Raman amplification region.

* * * * *